United States Patent [19]

Priepke

[11] 4,278,210
[45] Jul. 14, 1981

[54] FORAGE HARVESTER FEED ROLL MOUNTING MECHANISM

[75] Inventor: Edward H. Priepke, Stevens, Pa.

[73] Assignee: Sperry Corporation, New Holland, Pa.

[21] Appl. No.: 9,978

[22] Filed: Feb. 6, 1979

[51] Int. Cl.³ ............................................. B02C 18/22
[52] U.S. Cl. .................................. 241/222; 241/101.7
[58] Field of Search ...................... 241/101.7, 221-223

[56] References Cited

U.S. PATENT DOCUMENTS

| | | | |
|---|---|---|---|
| 2,612,974 | 10/1952 | Krause | 241/223 X |
| 3,342,231 | 9/1967 | Waldrop | 241/167 X |
| 3,431,712 | 3/1969 | Pröbsting | 241/101.7 X |
| 3,444,673 | 5/1969 | Evans | 241/222 X |
| 3,876,159 | 4/1975 | Kidd | 241/222 X |
| 3,985,306 | 10/1976 | Wagstaff | 241/167 X |
| 4,040,344 | 8/1977 | Moore et al. | 241/223 X |

*Primary Examiner*—Howard N. Goldberg
*Attorney, Agent, or Firm*—James R. Bell; Frank A. Seemar; Larry W. Miller

[57] ABSTRACT

In a forage harvester having a rotatable cutterhead and adjacently-positioned shearbar, an upper feed roll assembly comprising at least one upper feed roll mounted above and forwardly of the shearbar for movement by a pair of arms. A lower feed assembly cooperates with the upper feed roll assembly to convey crop material to the cutterhead across the shearbar. A tensioning assembly is coupled to the mounting arms for upper feed roll. First and second positions of the tensioning assembly provide a first condition in which the upper feed roll assembly is biased toward a lower operative position adjacent the cutterhead and shearbar and a second condition in which the bias on the upper feed roll assembly is relaxed, permitting movement to an upper inoperative position generally remote from the cutterhead and shearbar to thereby expose and render the shearbar readily accessible for servicing. A torque shaft is utilized to maintain the upper feed roll in a non-askew relationship by applying force via the tensioning assembly to the upper feed roll in its operative position.

8 Claims, 5 Drawing Figures

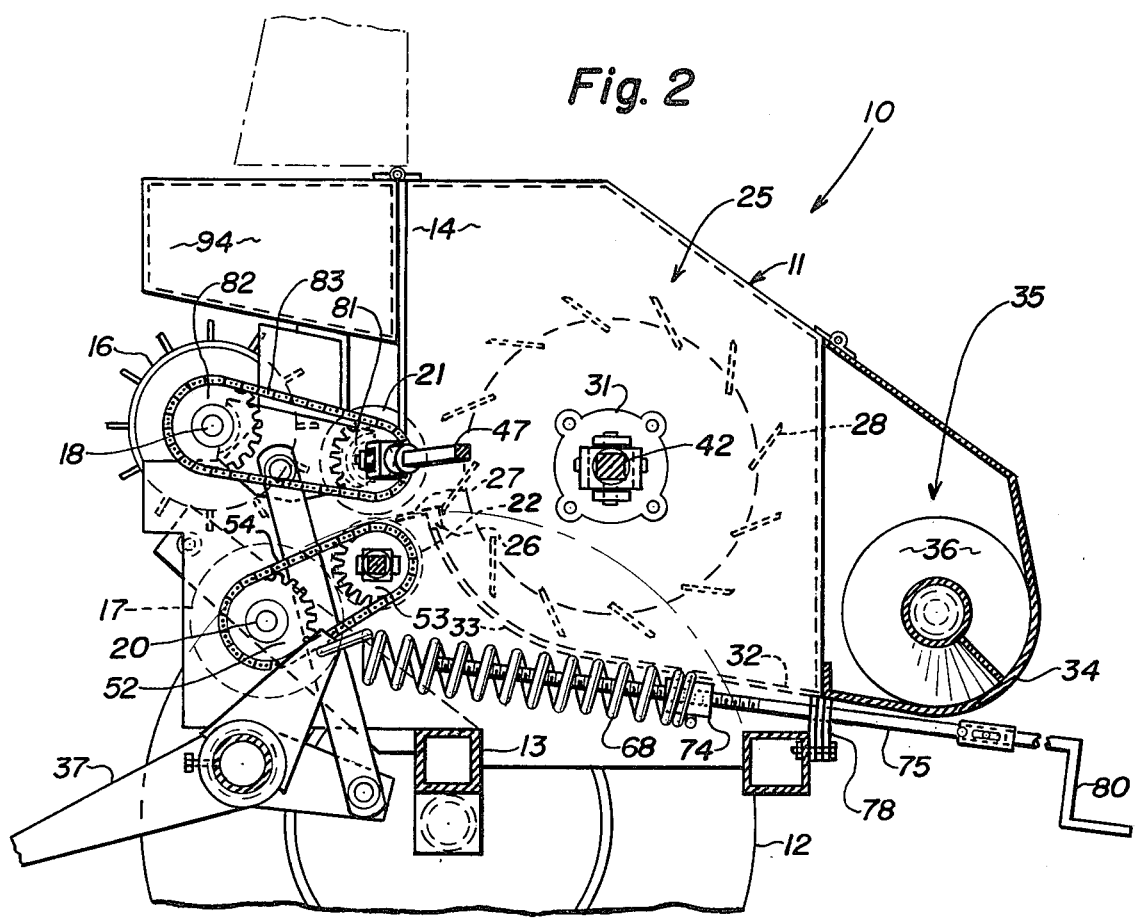
Fig. 2
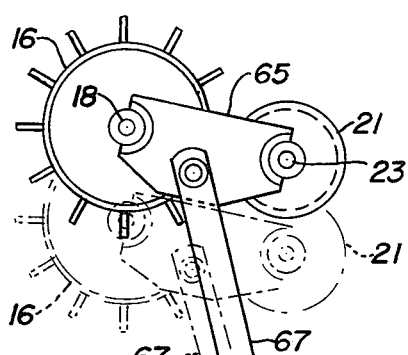
Fig. 3
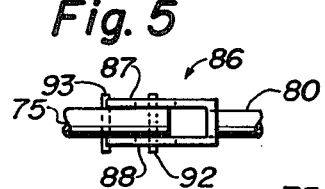
Fig. 5
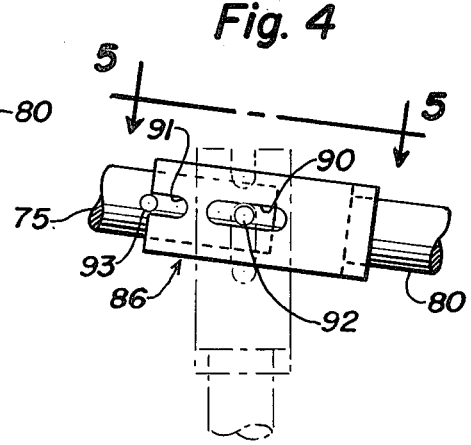
Fig. 4
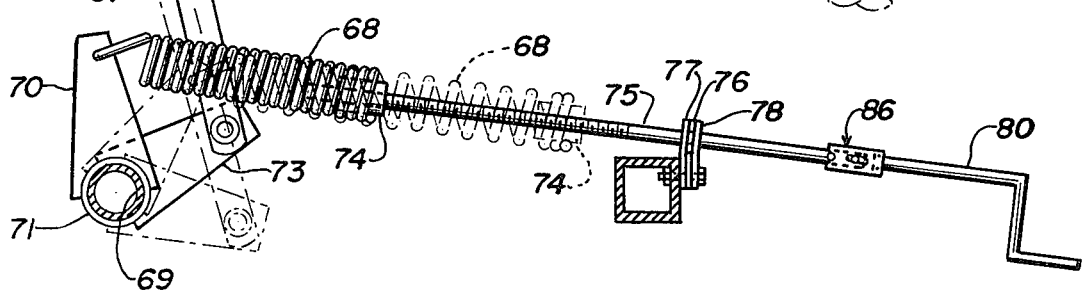

FORAGE HARVESTER FEED ROLL MOUNTING MECHANISM

BACKGROUND OF THE INVENTION

The present invention relates generally to forage harvesters and, more particularly, is concerned with improvements therein which facilitate easy access to the shearbar on the forage harvester for servicing and maintenance purposes.

In order to maintain the operating efficiency of a forage harvester of the type having a generally-cylindrical rotatable cutterhead with knives spaced about the periphery thereof and an adjacently-positioned, stationary shearbar cooperable with the knives to comminute crop material, it is necessary to maintain a desired uniform clearance between the shearbar and the cutterhead knives, such as from 0.010 to 0.015 inch, as the knives move past the shearbar during rotation of the cutterhead. Therefore, during harvesting season, clearance between the shearbar and the cutterhead knives must be gauged on a periodic basis by the operator and adjustment of the shearbar is made when needed. Otherwise, if the clearance is not checked closely and allowed to become excessive, the result will be unevenness in length of cut and rapid dulling of knives and shearbar. This will in turn cause greater power consumption and more fuel usage in the operation of the forage harvester.

Forage harvesters usually include tandemly arranged front and rear pairs of upper and lower feed rolls located forwardly of the cutterhead and shearbar. It is common for the lower rear roll to have a smooth outer cylindrical surface with a scraper mounted adjacent to and forwardly of the smooth roller for cleaning its surface. As in the case of the shearbar, it is necessary to maintain proper clearance between the scraper and the smooth lower roll in order to prevent buildup of crop material residue which could adversely affect operating efficiency of the forage harvester.

It is, therefore, highly desirable to make the shearbar and cutterhead area and the scraper and lower rear feed roll area of the forage harvester readily accessible so that it will be convenient for the operator to give close attention to the shearbar/cutterhead and scraper/roll clearances. One prior art arrangement on commercial forage harvesters attempts to provide a solution by placing a small door on one side of the cutterhead housing adjacent the shearbar and scraper mounting assembly. By gaining access through the door a feeler gauge may be inserted by the operator to check clearance between the shearbar and the cutterhead knives and between the scraper and the smooth feed roll. This method allows minimal visual contact by the operator with the area being gauged and thereby impedes application of the feeler gauge across the full width of the shearbar. Thus, due to a lack of visual accessibility, the operator usually relies mostly on blind feel with the gauge. As a result, operators using this method have a tendency to neglect making frequent adjustments to the shearbar and scraper clearances due to inaccuracies as well as difficulties encountered during the checking procedure.

The inherent disadvantages of the solution discussed above has lead recently to the incorporation in a commercially available forage harvester of a convenient simple method of gaining quick access to one or both of the critical clearance areas for servicing and maintenance purposes. This apparatus, shown in U.S. Pat. No. 3,985,306, issued on Oct. 12, 1976, in the name of Robert A. Wagstaff et al and assigned to a common assignee, provides a unique arrangement for removing the upper feed roll assembly.

Although the Wagstaff et al invention has been highly successful the trend toward larger forage harvesters has brought about the need for still further improvements due to the attendant increase in bulk and weight of components in heavy duty apparatus. More particularly, the upper feed rolls and mounting mechanisms therefor in larger capacity machines have increased in size and weight to the extent that they have become difficult if not almost impossible in some instances to manually lift out of the operative position.

Another problem that becomes more critical as the size of forage harvesters increase is the tendency of spring biased cylindrical feed rolls to become askew during uneven feeding and thereby causing undesirable racking during operation. A known prior art solution to racking employs a conventional torsion mechanism to apply uniform pressure to the ends of the feed rolls. An arrangement of this type is shown in U.S. Pat. No. 3,444,673 issued in the name of T. Evans on May 20, 1969. Heretofore, a torsion mechanism has not been successfully utilized in a forage harvester having flip up feed rolls of the type exemplified by the Wagstaff et al patent.

SUMMARY OF THE INVENTION

Accordingly, the purpose of the present invention is to promote greater attentiveness on the part of forage harvester operators to shearbar and scraper clearance adjustments and thereby contribute to the attainment of improved overall operating efficiency of forage harvesters and the production of a better quality forage product, regardless of the relative size of the unit. To this end, the principal object is to provide an improved forage harvester in which the affects of the aforementioned problems have been reduced.

In pursuance of these and other objects, the present invention contemplates forage harvester apparatus comprising the combination of a housing, a rotatable cutterhead mounted in the housing, a shearbar mounted in the housing forwardly of and closely adjacent to the cutterhead and cooperable therewith for comminuting crop material, an upper rotatable feed roll generally arranged in the housing forwardly of the cutterhead and shearbar, a lower feed assembly mounted in the housing below and cooperable with the upper feed roll for conveying crop material to the cutterhead across the shearbar, and improved means mounting the upper feed roll for movement away from the lower feed assembly to an upper inoperative position generally above the lower feed assembly and remote from the cutterhead and shearbar to thereby expose and render the shearbar readily accessible for servicing or the like.

In one embodiment the improved mounting means comprise a torque shaft mounted on the housing, and means coupled to the torque shaft for both maintaining the feed roll in a non-askew relationship thereto, as well as for lifting the upper rotatable feed roll to its nonoperative position. Actuatable means are provided for applying rotative force to the torque shaft, which actuatable means are movable to a first position for placing the torque shaft in a first condition in which the upper feed roll is biased downwardly in its lower operative feeding position via the coupling means. The actuatable means are also movable to a second position for placing the torque shaft in a second condition in which bias on the upper feed roll is relaxed for facilitating movement of the fed roll to its upper inoperative position via the coupling means.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

BRIEF DESCRIPTION OF THE DRAWINGS

FIG. 2 is a side elevational view taken along line 2—2 of FIG. 1.

FIG. 3 is a diagrammatic representation of the upper feed rolls and tensioning assembly shown in operative and inoperative positions.

FIG. 4 is a detailed view of the fold back latch on the crank shaft for the actuating mechanism.

FIG. 5 is a top view taken along line 5—5 of FIG. 4.

DESCRIPTION OF THE PREFERRED EMBODIMENT

Figure 1:
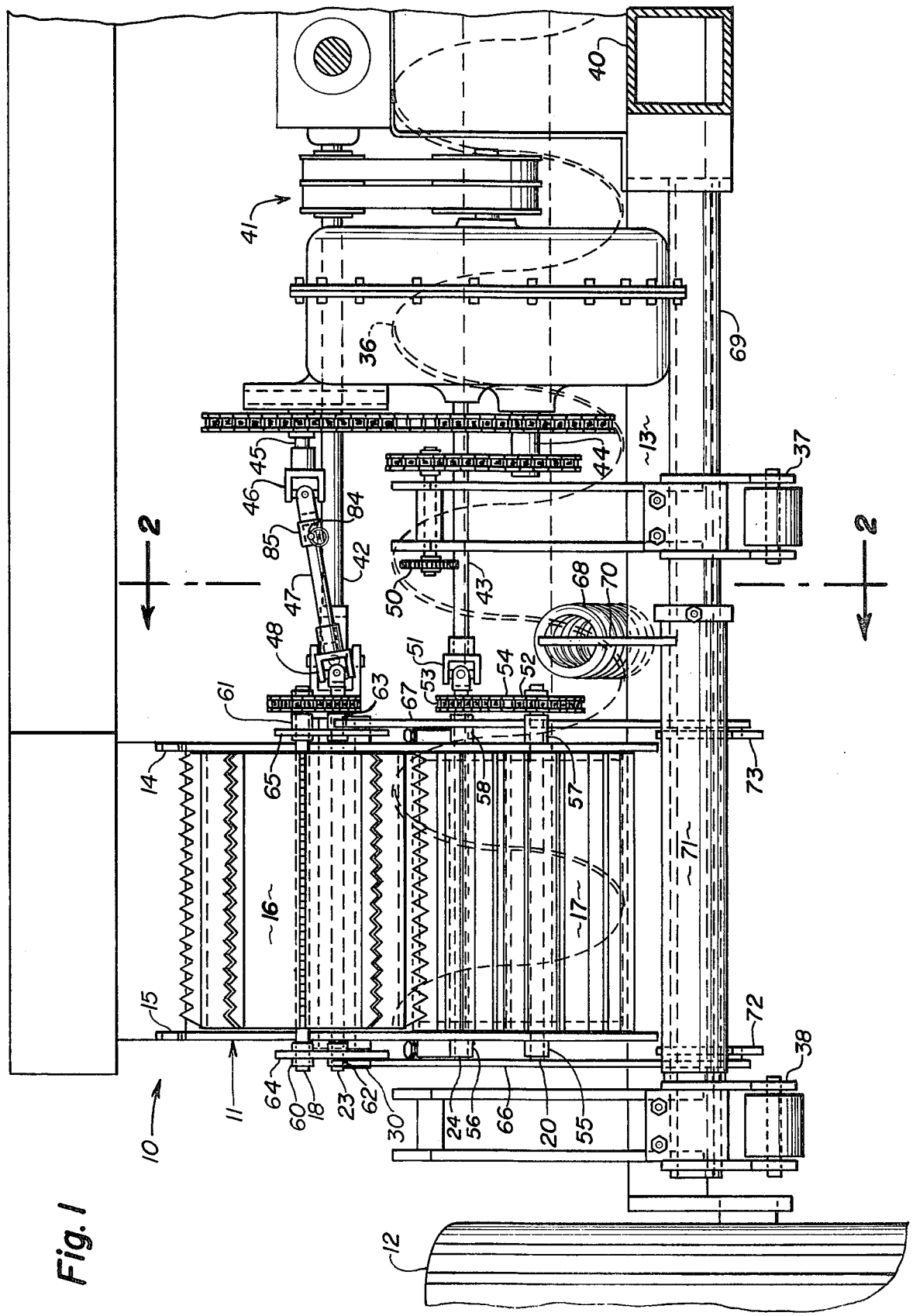
FIG. 1 is a partial front elevational view of a forage harvester embodying the principles of the present invention.

In the following description, right hand and left hand references are generally determined by standing at the rear of the machine and facing in the direction of forward travel. Also, in the following description, it is to be understood that such terms as "forward", "rearward", "left", "upwardly", etc., are words of convenience and are not to be construed as limiting terms.

Referring to the drawings, and more particularly to FIGS. 1 and 2, there is partially shown a forage harvester, generally designated by reference numeral 10, forming the preferred embodiment of the present invention (the front of the forage harvester being shown in FIG. 1). Although the forage harvester illustrated is a pull-type machine, the principles of the present invention are just as readily incorporated into a self-propelled machine or a tractor-mounted machine.

Forage harvester 10 generally comprises a housing 11, supported for movement across a field by a pair of spaced apart ground-engaging wheels 12 (only the right wheel being partly shown) rotatably mounted on opposite sides of a support frame including transversely-extending main frame member 13 fixed across the bottom of housing 11. The housing 11 includes a pair of spaced inner and outer vertical sidewalls 14,15 between which are mounted crop material feeding and comminuting components hereinafter described.

A forward set of feeding components in the form of upper and lower front feed rolls 16,17 rotatably mounted on shafts 18,20, respectively, within housing 11 in vertically spaced relationship by appropriate journals on opposing portions of housing sidewalls 14,15 and in transverse relationship to the forward direction of machine travel. Front rolls 16,17 each have aggressive peripheral surfaces for feeding crop material rearwardly between the rolls.

A second set of feeding components in the form of upper and lower rear feed rolls 21,22, is rotatably mounted on shafts 23,24, respectively, within housing 11 in vertically spaced relationship by appropriate journals on opposing portions of housing sidewalls 14,15 and in transverse relationship to the forward direction of machine travel. Rear rolls 21,22 are aligned behind front rolls 16,17 so as to receive crop material therefrom and compress it into a layer while feeding it rearwardly.

For comminuting the crop material, a knife-bearing cylindrical cutterhead 25 and a shearbar 26 (both of which are shown in FIG. 2 only) are positioned rearwardly of a scraper 27 and rear rolls 21,22. The cutterhead 25 comprises a plurality of knives 28 aranged in spaced relationship equidistant from a shaft 30 (see FIG. 1) rotatably mounted by appropriate journal means within housing 11 between housing sidewalls 14,15 rearwardly of rear rolls 21,22 and in transverse relationship to the forward direction of machine travel. The outer ends of cutterhead shaft 30 extend through openings (not shown) in sidewalls 14,15 and are rotatably journalled in inner and outer bearing assemblies (only inner assembly 31 shown, see FIG. 2) fixed to sidewalls 14,15 about the shaft-receiving openings. The transverse shearbar 26 is adjustably mounted in a known manner between the housing sidewalls in a stationary position closely adjacent the forward side of the cutterhead 25 to provide a predetermined clearance therebetween. The shearbar is aligned with rear feed rolls 21,22 such that the layer of crop material being fed rearwardly moves above shearbar 26 and into the path of knives 28 under conditions where the cutterhead rotates in a counterclockwise direction. The scraper 27, mentioned above, is mounted forwardly of and adjacent shearbar 26 for the purpose of preventing buildup of crop material on rear lower feed roll 22 which usually has a smooth peripheral surface. By the arrangement briefly described above, the crop material fed to cutterhead 25 and shearbar 26 is comminuted, chopped or cut into small pieces, commonly referred to as silage.

Housing 11 further includes a bottom wall 32 extending between sidewalls 14,15 and having an arcuate portion 33 generally underlying and concentric with cylindrical cutterhead 25. The arcuate wall portion 33 at its forward end is disposed adjacent to and extends downwardly and rearwardly from shearbar 26. The bottom wall 32 continues generally rearwardly to merge with a bottom wall 34 forming a hopper in which a transverse auger 35 is disposed. Auger flighting 36 conveys material from the right side of the machine (behind the cutterhead) along a transverse path, defined by the phantom outline shown in FIG. 1, to a discharge assembly such as a blower or the like (not shown) mounted on the main frame on the left side of the machine. More particularly, as cutterhead 25 is rotated, its knives 28 successively move past shearbar 26 to cut any crop material being fed rearwardly across the shearbar. The cut crop material is propelled along arcuate wall 33 and rearwardly through an appropriate opening in housing 11 whereupon auger 36 engages it and urges it transversely along wall 34 to the mentioned discharge assembly which conveys it into a trailing wagon (not shown) being towed behind forage harvester 10.

Turning now to the general feeding aspects of forage harvesters of the type shown, crop material is fed to the nip of front rolls 16,17 by a suitable header (not shown) mounted on the forward end of the support frame by means of support arms 37,38 and other conventional coupling means. The header usually comprises either a conventional row crop type or a conventional windrow pickup type, the latter of which is used for delivering windrowed crop material from the field to the front feed rolls while the former cuts and delivers crops growing in side-by-side rows.

Main frame member 13 supports conventional drive mechanisms for the feeding and comminuting components of the forage harvester 10 and also mounts a forwardly extending draft member 40 (shown in section in FIG. 1) by which the machine may be coupled to a tractor or the like for towing the machine across the field. Further detailed description of a main drive assembly 41 and draft member 40 of the forage harvester are unnecessary for a complete understanding of the present invention since they form no part thereof. Four driven output shafts 42,43,44 and 45 extend from and are driven by the main drive assembly 41. Of principal concern with respect to shaft 45 which drives the upper feed rolls via a first universal joint 46, an intermediate shaft 47 and a second universal joint 48. Insofar as the three other output shafts are concerned, shaft 44 is adapted to drive header mechanisms via a sprocket 50, shaft 42, drives cutterhead 25, and shaft 43 drives the lower feed rolls via a universal joint 51, sprockets 52,53 (FIG. 2) and chain 54.

The forage harvester heretofore broadly described is of a generally conventional nature. Hereinafter the improved mounting means for upper feed rolls 16 and 21 and the cooperative interrelationship of an anti-racking mechanism associated therewith as well as other improvements which combine to facilitate improved access to the shearbar and cutterhead area of the forage harvester will be described in detail.

Substantially in the same manner as provided on conventional forage harvesters, front and rear lower feed rolls 17 and 22 of forage harvester 10 are disposed in a fixed positional relationship with respect to housing sidewalls 14,15. The opposite outer ends of the front and read lower feed roll shafts 20,24, respectively, extend through openings (not shown) in the sidewalls 14,15 and are rotatably journalled in outer bearing elements 55,56 fixed to outer sidewall 15 about the shaft receiving opening therein, and inner bearing elements 57,58 fixed to inner sidewall 14 about the shaft receiving opening therein.

Front and rear upper feed rolls 16 and 21 are mounted on shafts 18 and 23, respectively, which extend transversely through housing 11 above the path along which material is fed to cutterhead 25. The shafts are rotatably journalled respectively in paired bearing elements 60,61 and 62,63 affixed to interconnecting arms 64 and 65. Interconnecting arms 64 and 65, have a bottom edge shape adapted to be seated in corresponding interfitting edge portions of the housing sidewalls. The arms are urged downwardly by main links 66,67 both of which are rotatably secured to interconnecting arms 64,65, respectively, in the vicinity of the lower edge. A downward biasing force on main links 66,67 is provided by spring 68 which is connected to a lever arm 70 attached to a tubular torque shaft 71, rotatably mounted on tensioning tubular support shaft 69. The force is transferred from shaft 71 to main link 67 via rigid links 72,73 affixed to and extending from torque shaft 71, which rigid links are pivotally connected to the lower end of main links 66,67. Thus, the upper feed rolls are urged downwardly into the operative position but are allowed to float upwardly when material flow is uneven or when slugs of material are introduced sporadically into the feed path. Torque shaft 71 retains upper feed rolls 16 and 21 in a parallel condition due to the wind up effect of the torque shaft. This prevents racking or askew feed rolls with respect to the side walls and enhances smooth operation under adverse conditions.

More particularly, with respect to the spring tensioning assembly, a nut 74 traveling along a threaded rod 75 moves rear to front or from left to right when viewing the machine shown in section in FIG. 2. Nut 74 is afffixed to the rear end of spring 68, and a collar 76 affixed to rod 75 is retained for rotation between brackets 77,78. Thus, rotation of rod 75 moves nut 74, and either decreases or increases the tension in spring 64 which in turn translates force through shaft 71 to increase or decrease the downward bias on interconnecting arms 64 and 65.

To lift the upper feed rolls to an inoperative position generally above the lower feed rolls and remote from the cutterhead and shearbar to expose the shearbar for accessibility for servicing and the like, a crank 80 rigidly secured to rod 75 is rotated in a manner such that nut 74 moves from rear to front to the extent that it compresses spring 68. This is diagrammatically illustrated in FIG. 3 in which the phantom outline shows the spring in its extended tension condition and the upper feed rolls in their spring biased downwardly urged lower operative position and the solid line depicts the spring in its fully compressed condition and the upper feed roll assembly in its inoperative position with the bias completely relaxed.

The upper feed rolls are driven via intermediate shaft 47 which rotates a sprocket 81, which in turn is coupled to a sprocket 82 via a chain 83. Thus, the main drive assembly 41 drives the upper feed rolls in a known manner under operative conditions. To facilitate translation of the upper feed roll mechanism to its inoperative position, the drive must be uncoupled. To this end, a removable pin 84 registered with an aperture in a collar 85 and a hole in intermediate shaft 47 to decouple the first universal joint 46 from the second universal joint 48 and thus disconnect the drive to the upper feed rolls and permit translation of the upper feed roll mechanism from operative to inoperative positions.

FIGS. 4 and 5 show a detailed view of means for pivoting crank 80 from its operative position to its inoperative position. A bifurcated coupling element 86 has opposing arms 87,88 each of which is provided with a slot 90 and a notch 91 which cooperate with pins 92,93, respectively. In the operative position, notch 91 cooperates with pin 93 of coupling element 86 as illustrated in solid lines in FIG. 5. To pivot crank 80 to its inoperative position coupling element 86 is slid rearwardly to a point where notch 91 becomes disengaged from pin 93 and thereby permits the crank to be pivoted freely to the position illustrated by the phantom outline in FIG. 4. Crank 80 can be held in its inoperative position by frictional force between element 86 and rod 75 or other positive conventional means.

In operation, material is fed into the front inlet between the nip of the upper and lower front feed rolls under conditions where a cover 94 is in the solid line position shown in FIG. 2. This type of feeding is conventional and is described in detail in U.S. Pat. No. 3,985,306, referred to above. Under conditions where it becomes necessary or desirable to expose the shearbar for access or servicing the upper feed roll assembly is moved from its lower operative position to its upper inoperative position. The unique mounting means of the present invention permit the assembly to be moved or lifting via the same means that retain it downwardly in its operative position for cooperation with the fixed lower feeding mechanism. The rotatably mounted torque shaft 71 functions with coupling means to maintain the feed rolls in non-askew relationship thereto, in both operative and inoperative conditions as well as being utilized to lift the feed rolls. In this latter instance the upper feed rolls are automatically lifted to the position shown in FIG. 3 by turning crank 80 to rotate rod 75 and thereby move nut 74 from right to left (FIG. 2) and exert force on lever arm 70 to move it from its phantom position (FIG. 3) to its solid position. In this manner interconnecting arms 64 and 65 are lifted via main links 66,67 and rigid links 72,73 due to force resulting from rotational force exerted on shaft 71. Minimal force is required to lift the rolls to the position shown in FIG. 3 by rotating rod 75 and utilizing the mechanical advantage inherent in the threaded rod and traveling nut combination. As the upper feed roll assembly is being translated upwardly large slots formed in housing 11 accommodate the feed roll bearing assemblies. When the upper feed roll assembly reaches the top of the slots, cover 94 pivoted to the position shown by phantom outline in FIG. 2 permitting complete access. At this position the bias is completely relaxed facilitating further upward movement of the upper feed rolls if desired. For example, the rear roll can be pivoted upwardly with respect to the front roll about a pivot axis through the interconnecting arms. In this condition the torque shaft prevents racking but is not used to apply a biasing force due to the fully compressed position of spring 68.

Many advantages, explicit and implicit from the above description are deemed to be apparent. A quick and easy method of exposing the cutterhead, shearbar, scraper and smooth feed roll is provided by relaxing the tension imposed on the upper feed roll mechanism via a unique mounting arangement which provides actuating means for automatically lifting the feed rolls in a non-askew manner without necessitating any manual operation other than rotation of a conveniently positioned crank. Thus, reduced effort on the part of the operator then heretofore was realized is provided. One important advantage of the present invention is the ease of translation of the upper feed means which enhances the overall operator's ability to perform servicing and maintenance procedures on the forage harvester unit.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a forage harvester having
   (a) a housing,
   (b) a rotatable cutterhead mounted in said housing,
   (c) a shearbar mounted in said housing forwardly of and closely adjacent to said cutterhead and cooperable therewith for comminuting crop material,
   (d) front and rear upper rotatable feed rolls generally tandemly-arranged in said housing forwardly of said cutterhead and said shearbar,
   (e) lower feed means mounted in said housing generally below and cooperable with said upper feed rolls for conveying crop material to said cutterhead across said shearbar,
   (f) improved means mounting said front and rear upper feed rolls for movement away from said lower feed means from a lower operative feeding position to an upper inoperative position generally above said lower feed means and remote from said cutterhead and shearbar to thereby expose and render said shearbar readily accessible for servicing or the like, said improved mounting means comprising
      a torque shaft,
      means for rotatably mounting said torque shaft on said housing,
      means coupled to said torque shaft for lifting said front and rear upper rotatable feed rolls,
      actuatable means for applying rotative force to said torque shaft, said actuatable means being movable to a first position for placing said torque shaft in a first condition under which said front and rear upper feed rolls are biased downwardly in said lower operative feeding position via said coupling means, said actuatable means also being movable to a second position for placing said torque shaft in a second condition under which said bias on said front and rear upper feed rolls is relaxed for facilitating movement of said front and rear upper feed rolls to said upper inoperative position via said coupling means, and
      drive means coupled to said upper rear feed roll under conditions where said upper feed roll is in its operative position and means for detaching said drive means to permit movement of said rear roll from said lower operative position to said inoperative position.

2. The forage harvester set forth in claim 1, wherein said improved mounting means further comprise a pair of arms rotatably connected to opposite ends of said front and rear rolls, said arms mounting said upper front and rear roll for movement in concert between said lower and upper positions and said lifting means includes means coupling said torque shaft to said arms.

3. The forage harvester set forth in claim 2, wherein said means coupling said torque shaft to said arms comprises a rigid link movable between first and second positions in response to rotative force applied by said actuatable means being moved between its respective first and second positions.

4. The forage harvester set forth in claim 1, wherein said lower feed means includes a rotatable rear feed roll mounted forwardly of said shearbar and having a generally smooth cylindrical outer surface,
   a scraper mounted in said housing generally between said rear lower roll and said shearbar for preventing buildup of crop material on said lower roll, said scraper and lower roll being exposed and rendered readily accessible for servicing or the like upon movement of said upper front and rear feed roll from said lower operative position to said upper inoperative position, and
   said improved mounting means further comprising
      a pair of arms rotatably connected to opposite ends of said front and rear upper rolls, said arms mounting said upper front and rear rolls for movement in concert between said lower and upper positions and said lifting means includes means coupling said torque shaft to said arms.

5. The forage harvester set forth in claim 4, wherein said means coupling said torque shaft to said arms comprises a rigid link movable between first and second positions in response to rotative force applied by said actuatable means being moved between its respective first and second positions.

6. In a forage harvester having
  (a) a housing,
  (b) a rotatable cutterhead mounted in said housing,
  (c) a shearbar mounted in said housing forwardly of and closely adjacent to said cutterhead and cooperable therewith for comminuting crop material,
  (d) an upper rotatable feed roll generally arranged in said housing forwardly of said cutterhead and said shearbar,
  (e) lower feed means mounted in said housing generally below and cooperable with said upper feed roll for conveying crop material to said cutterhead across said shearbar,
  (f) improved means mounting said upper feed roll for movement away from said lower feed means from a lower operative feeding position to an upper inoperative position generally above said lower feed means and remote from said cutterhead and shearbar to thereby expose and render said shearbar readily accessible for servicing or the like, said improved mounting means comprising
  a torque shaft rotatably mounted on said housing,
  means coupled to said torque shaft for maintaining said feed roll in a non-askew relationship thereto and for lifting said upper rotatable feed rolls,
  actuatable means spaced from said means for maintaining and lifting for applying rotative force to said torque shaft, said actuatable means being movable to a first position for placing said torque shaft in a first condition under which said upper feed roll is biased downwardly in said lower operative feeding position via said coupling means, said actuatable means also being movable to a second position for placing said torque shaft in a second condition under which said bias on said upper feed rolls is relaxed for facilitating movement of said feed roll to said upper inoperative position via said coupling means, and
  drive means coupled to said upper feed roll under conditions where said upper feed roll is in its operative position and means for detaching said drive means to permit movement of said upper feed roll from said lower operative position to said inoperative position.

7. The forage harvester set forth in claim 6, wherein said lower feed means includes a rotatable rear lower feed roll mounted forwardly of said shearbar and having a generally smooth cylindrical outer surface, and
a scraper mounted in said housing generally between said rear lower roll and said shearbar for preventing buildup of crop material on said lower roll, said scraper and lower roll being exposed and rendered readily accessible for servicing or the like upon movement of said upper feed roll from said lower operative position to said upper inoperative position,
said improved mounting means further comprising a pair of arms rotatably connected to opposite ends of said upper roll, said arms mounting said upper roll for movement between said lower and upper roll for movement between said lower and upper positions, and
said mounting means further includes linkage means coupling said torque shaft to said arms for maintaining said non-askew relationship.

8. The forage harvester set forth in claim 7, wherein said linkage means comprises a rigid link movable between first and second positions in response to rotative force applied by said actuatable means being moved between its respective first and second positions.

* * * * *